United States Patent [19]
Helmond et al.

[11] Patent Number: 6,005,033
[45] Date of Patent: Dec. 21, 1999

[54] POLYKETONE FLAME RETARDANT COMPOSITION

[75] Inventors: Johannes Van Helmond, Bergen op Zoom; Gerrit De Wit, Ossendrecht, both of Netherlands

[73] Assignee: General Electric Company, Pittsfield, Mass.

[21] Appl. No.: 08/986,050

[22] Filed: Dec. 5, 1997

[51] Int. Cl.⁶ .......................................................... C08J 5/35
[52] U.S. Cl. ............................ 524/101; 524/100; 528/392
[58] Field of Search ..................................... 524/100, 101; 528/392

[56] References Cited

U.S. PATENT DOCUMENTS

| | | |
|---|---|---|
| 4,117,200 | 9/1978 | Leman et al. . |
| 4,579,894 | 4/1986 | Bertelli et al. . |
| 4,761,449 | 8/1988 | Lutz . |
| 4,885,318 | 12/1989 | Danforth et al. . |
| 4,885,328 | 12/1989 | Danforth et al. . |
| 4,921,897 | 5/1990 | Danforth et al. . |
| 5,030,674 | 7/1991 | Notorgiacomi, Jr. . |
| 5,633,301 | 5/1997 | Moy et al. ............................... 524/100 |

FOREIGN PATENT DOCUMENTS

WO 97 44385  11/1997  WIPO .

*Primary Examiner*—Melvyn I. Marquis
*Assistant Examiner*—D. Aylward

[57] ABSTRACT

Flame retardant compositions comprising a polymer of carbon monoxide, and at least one olefin, and a flame retarding quantity of a melamine compound.

8 Claims, No Drawings

POLYKETONE FLAME RETARDANT COMPOSITION

CROSS-REFERENCE TO RELATED APPLICATIONS

Not Applicable

STATEMENT REGARDING FEDERALLY SPONSORED RESEARCH

Not Applicable

FIELD OF THE INVENTION

Polymer composition comprising polymers of carbon monoxide and at least one olefin and certain flame retardants show good flame retardant properties.

BACKGROUND OF THE INVENTION

Polymer compositions comprising polymers of carbon monoxide and at least one olefin are generally known. Of particular interest are compositions comprising linear alternating polymers of carbon monoxide and one or more olefins, hereafter called polyketones.

Polymer compositions comprising a polyketone and a flame retardant are also known and have been described for example in U.S. Pat. No. 4,761,449; U.S. Pat. No. 4,885,328; U.S. Pat. No. 4,885,318; U.S. Pat. No. 4,921,897; U.S. Pat. No. 5,030,674. U.S. Pat. No. 5,030,674 describes by way of example the use of cyclic phosphonate esters. With such phosphonate esters it is not possible to obtain a V-O rating according to UL-94, without the use of an anti-drip agent as for example PTFE.

U.S. Pat. No. 4,579,894 dealing with other polymers like polyolefins describes the use of melamine compounds as flame retardants; the melamine is however used in combination with other flame retardants. U.S. Pat. No. 4,117,200 describes the use of melamine phosphates for wood products.

The present invention resulted in new compositions with excellent flame retardant properties without the use of halogenated flame retardants. With the invention it is possible to obtain compositions with a V-0 rating in the UL 94 test for flame retardancy.

SUMMARY OF THE INVENTION

This invention relates to flame retardant compositions comprising (a) a polymer of carbon monoxide and at least one olefin and (b) a flame retarding quantity of a melamine compound. The melamine compound acts as a flame retardant agent.

DESCRIPTION OF THE INVENTION

The polymers used in the polymer compositions of the invention are meant to include all polymers containing units derived from carbon monoxide and units derived from one or more olefins. This definition includes both random polymers produced by radical polymerization and linear alternating polymers, hereafter called polyketones. The polymer compositions of the invention preferably comprise polyketones. Suitable polyketones and processes for their preparation have been described in European Patent Applications 121,965; 181,044; 222,454 and 257,663.

Suitable olefin units are those derived from C2 to C12 alpha-olefins of substituted derivatives thereof or styrene or alkyl substituted derivatives of styrene. It is preferred that such olefin of olefins are selected from C2 to C6 normal alpha-olefins and it is particularly preferred that the olefin units are either derived from ethylene or most preferred of all from a mixture of ethylene and one or more C3 to C6 normal alpha-olefin(s) especially propylene. In these most preferable materials it is further preferred that the molar ratio of ethylene units to C3 to C6 normal alpha-olefin units is greater than or equal to 1 most preferably between 2 and 30.

The polyketones described above are suitably prepared by the processes described in EP121965 or modifications thereof. In general terms, this comprises reacting carbon monoxide and the chosen olefin(s) at elevated temperature and pressure with a catalyst which is preferably comprised of palladium, a bidentate phosphine, such as bis (diphenylphosphino)propane, and an anion which either does not coordinate to the palladium or coordinates only weakly. Examples of such anions include p-toluenesulfonate, tetrafluoroborate, borosalicylate and the like. The process is suitably carried out at a temperature in the range 50 to 150 C, a pressure in the range 25 to 75 bar gauge and in a solvent such as methanol, acetone, THF or the like.

Of particular interest are the polyketones with a molecular weight (average by number) from about 1,000 to 200,000, particularly of about 10,000–100,000, containing substantially equimolar quantities of carbon monoxide and olefinic units, derived from one or more olefins.

The flame retardant compositions of the invention contain a flame retarding quantity of a melamine compound. Suitable melamine compounds are melamine cyanurate $(C_3H_6N_6)$. $(C_3H_3N_3O_3)$; melamine phosphates such as mono-melamine phosphate $(C_3H_6N_6)$. $H_3PO_4$ and di-melamine phosphate $(C_3H_6N_6)_2$. $H_3PO_4$. Particularly suitable is mono-melamine phosphate.

The melamine compound is usually added in a quantity of 5–50 parts per weight per 100 parts by weight of the polymer (a); more preferably in a quantity of 10–30 parts by weight.

The flame retardants may be employed in combination with other flame retardants such as phosphonates, phosphates alkaline earth metal carbonates, alkaline earth metal hydroxides and metal borates.

The polymer compositions of the invention are produced by mixing the flame retardants through the polymer. The method of producing the composition is not critical so long as the method results in a relative uniform mixture. In a preferred embodiment the compositions are produced by heating the polymer until molten and by mixing the flame retardant with the polymer by use of a high-shear mixers or extruders.

The polymer compositions of the invention may comprise in addition to the melamine compound other conventional additives. Examples of other additions are fillers, reinforcing fibers such as glass fibers or carbon fibers, mold release agents, plasticizers, processing aids.

The polymer compositions of the invention may further comprise other polymers such as polycarbonates and polyesters like polybutyleneterephthalates. It is also possible to add polymers to improve to the impact strength (impact modifiers). Impact modifiers usually comprise a rubbery part and some other comonomers. Examples are the vinylaromatic-rubbery diblock and triblock copolymers and so-called graft copolymers comprising a rubbery backbone upon which one or more monomers have been grafted.

The polymer compositions may be processed by injection molding or other conventional processes.

EXAMPLES I–III

Comparative Examples A–B

In all example a polyketone has been used with about 50 mol % carbon monoxide units, 45 mol % ethylene derived units and about 5 mol % propylene derived units, with a melting point of 222° C.

The compositions have been prepared by blending the components as indicated in the following table A in a twin screw extruder with an average temperature setting of 240° C. The extrudate was pelletized. Out of the pellets were formed UL bars with a thickness of 1 mm by injection molding. The flame retardant properties were determined in accordance with the UL-94 norm. The results are also shown in table A.

TABLE A

| | Example | | | | |
|---|---|---|---|---|---|
| | A[1] | B[1] | I[1] | II[1] | III[1] |
| Compositions (parts by weight) | | | | | |
| *Polyketone | 98.9 | 68.9 | 88.9 | 78.9 | 78.9 |
| *Stabilizer package | 1.1 | 1.1 | 1.1 | 1.1 | 1.1 |
| *Phosphonate ester[2] | — | 30 | — | — | — |
| *Melamine cyanurate | — | — | 10 | — | — |
| *Di-Melamine phosphate | — | — | — | 20 | — |
| *Mono-Melamine phosphate | — | — | — | — | 20 |
| Test Results | | | | | |
| Flammability rating according to UL-94[3] | HB | V-2 | V-2 | V-1 | V-0 |

Notes:
[1]Example C is a comparative example; examples IV and V represent the Examples A and B are comparative examples; examples I, II and III represent the compositions of the invention.
[2]A commercially available flame retardant (amgard P45 of Albright & Wilson) in the form of a masterbatch comprising abot 30% by weight of a cyclic phosphonate ester and about 70% by weight of a poly ethylene terephthalate.
[3]V-O is the best rating followed by V-1, V-2 and HB in decreasing order of flame retardant properties.

TABLE B

| | Example | | |
|---|---|---|---|
| | C[1] | IV[1] | V[1] |
| Compositions (parts by weight) | | | |
| *polyketone | 68 | 57 | 54 |
| *Stabilizer package | 1.5 | 1.5 | 1.5 |
| *Mono-melamine phosphate | — | 6 | 12 |
| *Resorcinoldiphosphate | — | 5 | 2 |
| *PTFE[4] | 0.5 | 0.5 | 0.5 |

TABLE B-continued

| | Example | | |
|---|---|---|---|
| | C[1] | IV[1] | V[1] |
| *Glass Fiber | 30 | 30 | 30 |
| Test Results | | | |
| Flammability rating according to UL-94[3] | HB | V-0 | V-0 |

Notes:
[1]compositions of the invention.
[3]V-0 is the best rafing followed by V-1,V-2 and HB in decreasing order of flame retardant properties.
[4]PTFE: 50% masterbatch of PTFE in SAN.

The results of table A and B show that melamine compounds are effective flame retardants for polymer compositions comprising a polyketone. As can be seen from example III the preferred melamine compound is mono-melamine phosphate. Examples IV and V show that mixtures of melamine compounds with phosphates are effective flame retardants.

All patents and patent applications mentioned here above are incorporated by reference into this application for a patent.

We claim:

1. A polymer composition which consists essentially of
    (a) a polymer of carbon monoxide and at least one olefin and
    (b) a flame retarding quantity of a melamine compound.
2. A polymer composition as claimed in claim 1 wherein the polymer (a) is a polyketone.
3. A polymer composition as claimed in claim 2 wherein the polyketone is a terpolymer of carbon monoxide, ethylene and propylene.
4. A polymer composition as claimed in claim 1 wherein the melamine compound is a melamine phosphate.
5. A polymer composition as claimed in claim 1 wherein the melamine compound is a mono melamine phosphate.
6. A polymer composition as claimed in claim 1 wherein per 100 parts by weight of the polymer (a) there are 5–50 parts by weight of the melamine compound (b).
7. A polymer composition as claimed in claim 1 which additionally contains alkaline earth metal carbonates, alkaline earth metal hydroxides, metal borates, PTFE or mixtures thereof.
8. A polymer composition as claimed in claim 1 which additionally contains reinforcing fillers, anti-oxidants, impact modifiers, other polymers or mixtures thereof.

* * * * *